United States Patent [19]

Liet et al.

[11] 4,336,732
[45] Jun. 29, 1982

[54] DEVICE FOR CUTTING OUT AND TRANSPORTING A SILAGE BLOCK

[75] Inventors: Fredericus Liet, HD Losser; Cornelis H. Liet, PJ Losser, both of Netherlands

[73] Assignee: Trioliet Silo Europe B.V., AE Losser, Netherlands

[21] Appl. No.: 157,170

[22] Filed: Jun. 6, 1980

[30] Foreign Application Priority Data

Jun. 8, 1979 [NL] Netherlands ............... 7904534

[51] Int. Cl.³ ................ A01F 25/20; B65G 65/40
[52] U.S. Cl. ............................. 83/109; 83/565; 83/747; 83/758; 83/928; 241/30; 241/101.7; 30/379.5
[58] Field of Search ............... 83/109, 758, 565, 928, 83/747, 761; 241/101.7, 30; 30/379.5

[56] References Cited

U.S. PATENT DOCUMENTS

| | | | |
|---|---|---|---|
| 2,490,281 | 12/1949 | Rose | 83/747 |
| 3,729,822 | 5/1973 | Batson | 83/747 |
| 4,058,038 | 11/1977 | Tenhunen | 83/928 |

FOREIGN PATENT DOCUMENTS

| | | |
|---|---|---|
| 2333052 | 1/1975 | Fed. Rep. of Germany . |
| 2170276 | 9/1973 | France . |
| 2218046 | 9/1974 | France . |
| 2251254 | 6/1975 | France . |
| 7903223 | 4/1979 | Netherlands ............... 83/928 |
| 1518595 | 7/1978 | United Kingdom . |

Primary Examiner—Donald R. Schran
Attorney, Agent, or Firm—Holman & Stern

[57] ABSTRACT

A device for cutting out and transporting a silage block, comprising a main frame which may be connected to a tractor and which comprises an at least approximately horizontal cross-beam, which carries a plurality of parallel tines and to which an upstanding main frame part is connected. This upstanding main frame part supports near its upper end an at least approximately horizontal frame member, which forms an approximately U-shaped guide along which a drive housing may be reciprocated. A sawing means is guided in this drive housing for upward and downward movement. In both corners of the frame member which are remote from the upstanding main frame part the sawing means is rotatable over at least approximately 90° about an axis of rotation which is at least approximately stationary during this rotating motion and which extends at a distance from the longitudinal center line of the sawing means which is smaller than the width of the sawing means.

26 Claims, 9 Drawing Figures

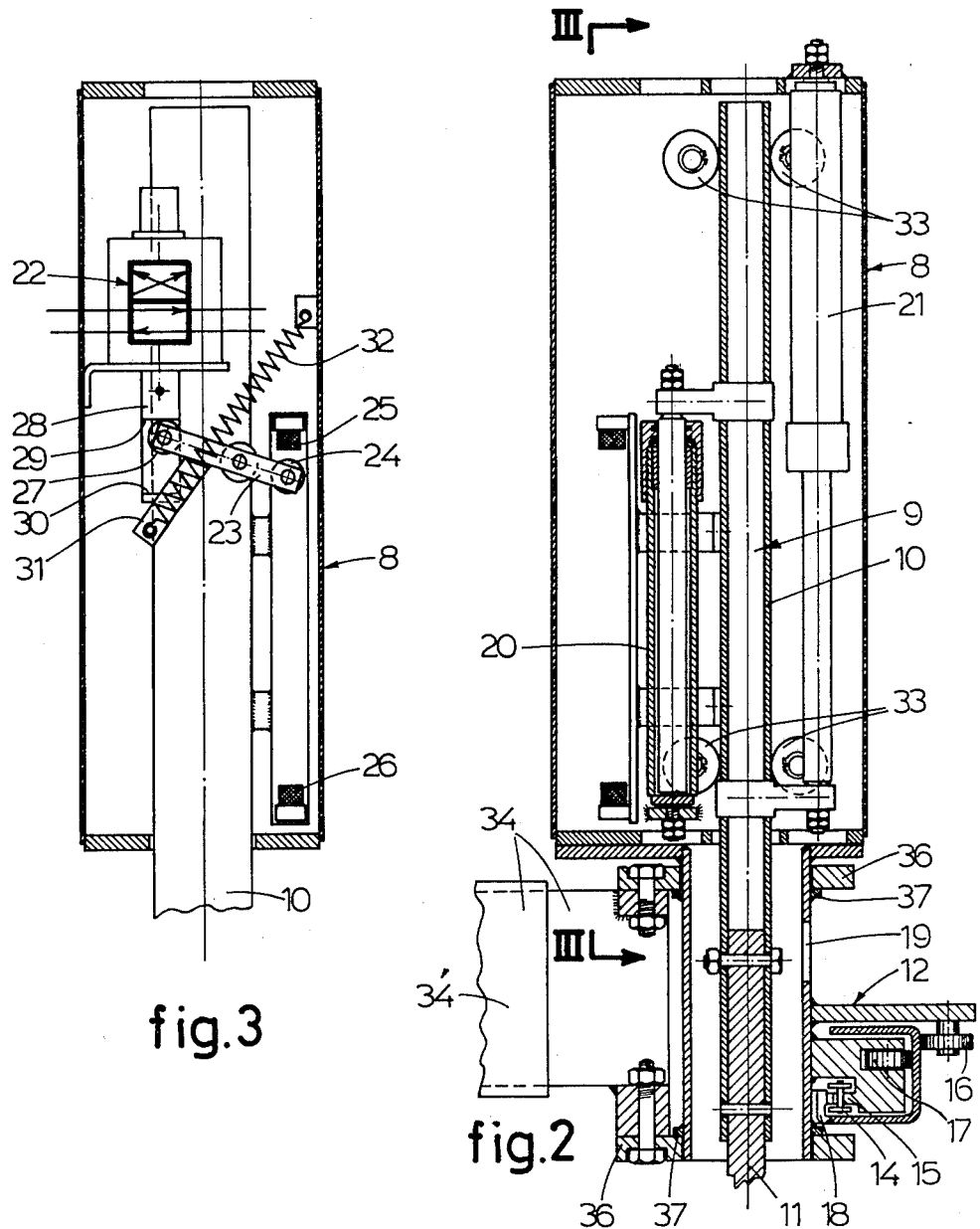

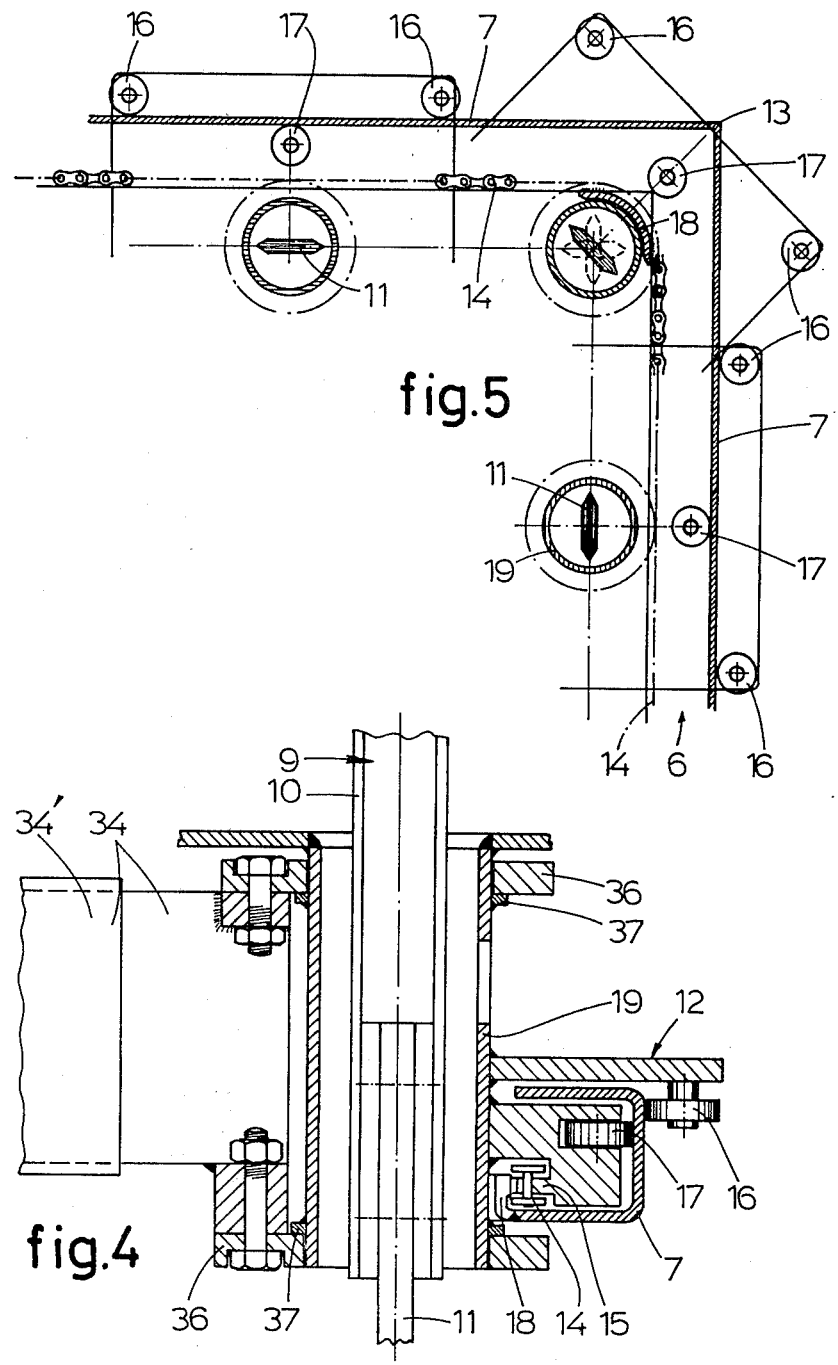

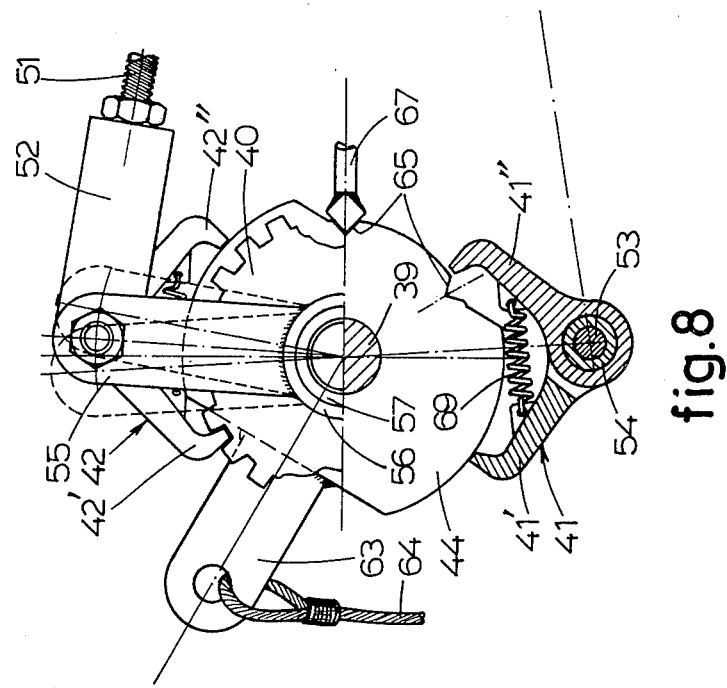
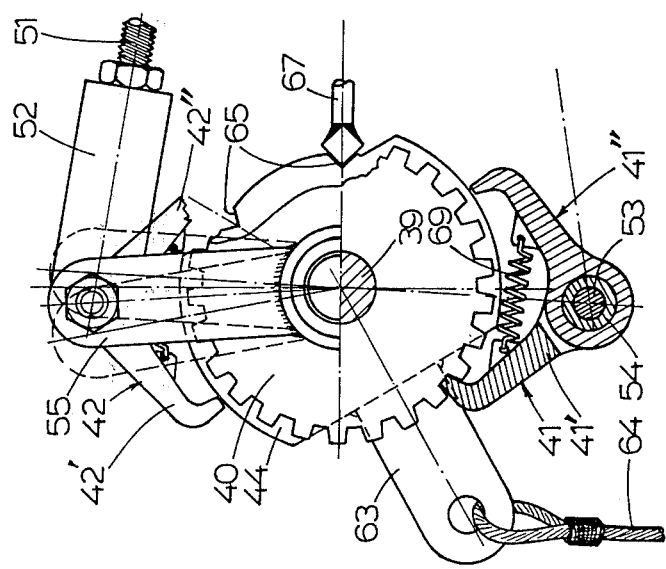

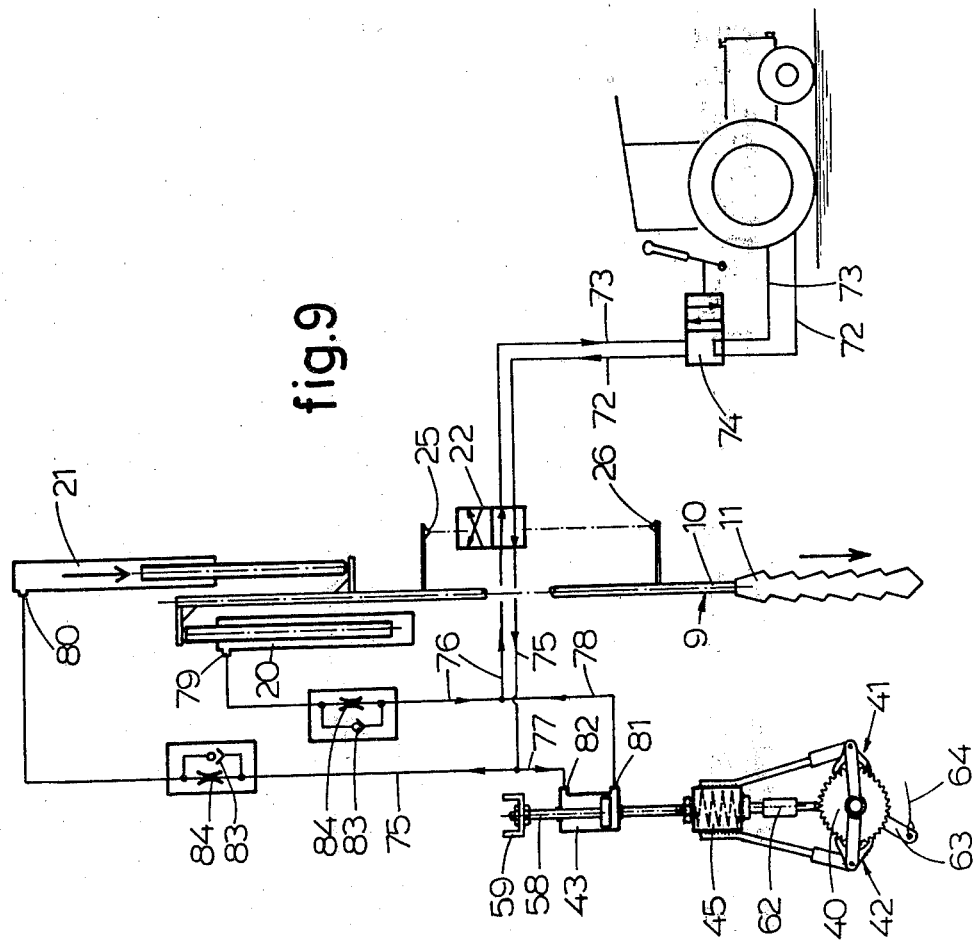

DEVICE FOR CUTTING OUT AND TRANSPORTING A SILAGE BLOCK

BACKGROUND OF THE INVENTION

The invention relates to a device for cutting out and transporting a silage block, comprising a main frame which may be connected to a tractor and which comprises an at least approximately horizontal cross-beam, which carries a plurality of parallel tines and to which an upstanding main frame part is connected, which supports near its upper end an at least approximately horizontal frame member, which forms an approximately U-shaped guide along which a drive housing may be reciprocated, a sawing means being guided in this drive housing for upward and downward movement.

In a known device of this type the sawing means passes a bend of about 90° in the two corners of the U-shaped guide, which are remote from the upstanding main frame part. These bends have a rather large radius. The operative front side of the saw which is pressed through the silage during the sawing operation has to be positioned tangential to this bend. However, in view of the fact that the saw has a certain width, it is not possible for the rear side of the saw also to be positioned tangentially to the bend during the passage through this bend. Therefore, this rear side of the saw will describe a bend with a larger radius and will have to push silage material away, giving rise to large torsion forces in the saw. These torsion forces increase with the width of the saw, as more silage material has to be pushed aside. Furthermore, the lower end of the saw of the known device will run out while passing through the bend. Due to these phenomena the saw may break during the passage of the bends. In connection herewith both the length and the width of the saw to be used are subject to limitations.

SUMMARY OF THE INVENTION

It is an object of the present invention to provide a device of the above-mentioned type, wherein this disadvantage has been removed in a simple, but nevertheless effective manner.

For this purpose the device for cutting out and transporting a silage block according to the invention is characterized in that in both corners of the frame member which are remote from the upstanding main frame part the sawing means is rotatable over at least approximately 90° about an axis of rotation which is at least approximately stationary during this rotating motion and which extends at a distance from the longitudinal center line of the sawing means which is smaller than the width of the sawing means.

In this manner it is achieved that during the passage of the corners of the U-shaped guide, which are remote from the upstanding main frame part, the torsion forces which are exerted on the sawing means are considerably decreased. For this reason it is possible to apply a saw with a greater length and a greater width than would be possible in the known device without any danger of saw breakage.

Preferably the distance of the axis of rotation from the longitudinal center line of the sawing means is smaller than half the width of this sawing means, while in an extremely favourable embodiment of the device according to the invention the axis of rotation at least approximately coincides with the longitudinal center line of the sawing means.

BRIEF DESCRIPTION OF THE DRAWINGS

The invention is explained more in detail hereinafter with reference to the drawings, which schematically show an embodiment of a device according to the invention for cutting out and transporting a silage block.

FIG. 2 is a cross-sectional view taken along the plane II—II in FIG. 1, on a larger scale.

FIG. 3 is a cross-sectional view taken along the plane III—III in FIG. 2, in which the cylinder-plunger units have been left out.

FIG. 4 is a lower part of the view shown in FIG. 2, on a larger scale.

FIG. 5 is a cross-sectional view taken along the plane V—V in FIG. 1.

FIGS. 7 and 8 are top plan views, partly in section and enlarged, of a part of the ratchet mechanisms of FIG. 6, in various positions.

FIG. 9 is a schematic illustration of an embodiment of the hydraulic circuit for the device according to the invention.

DESCRIPTION OF A PREFERRED EMBODIMENT

Figure 1:
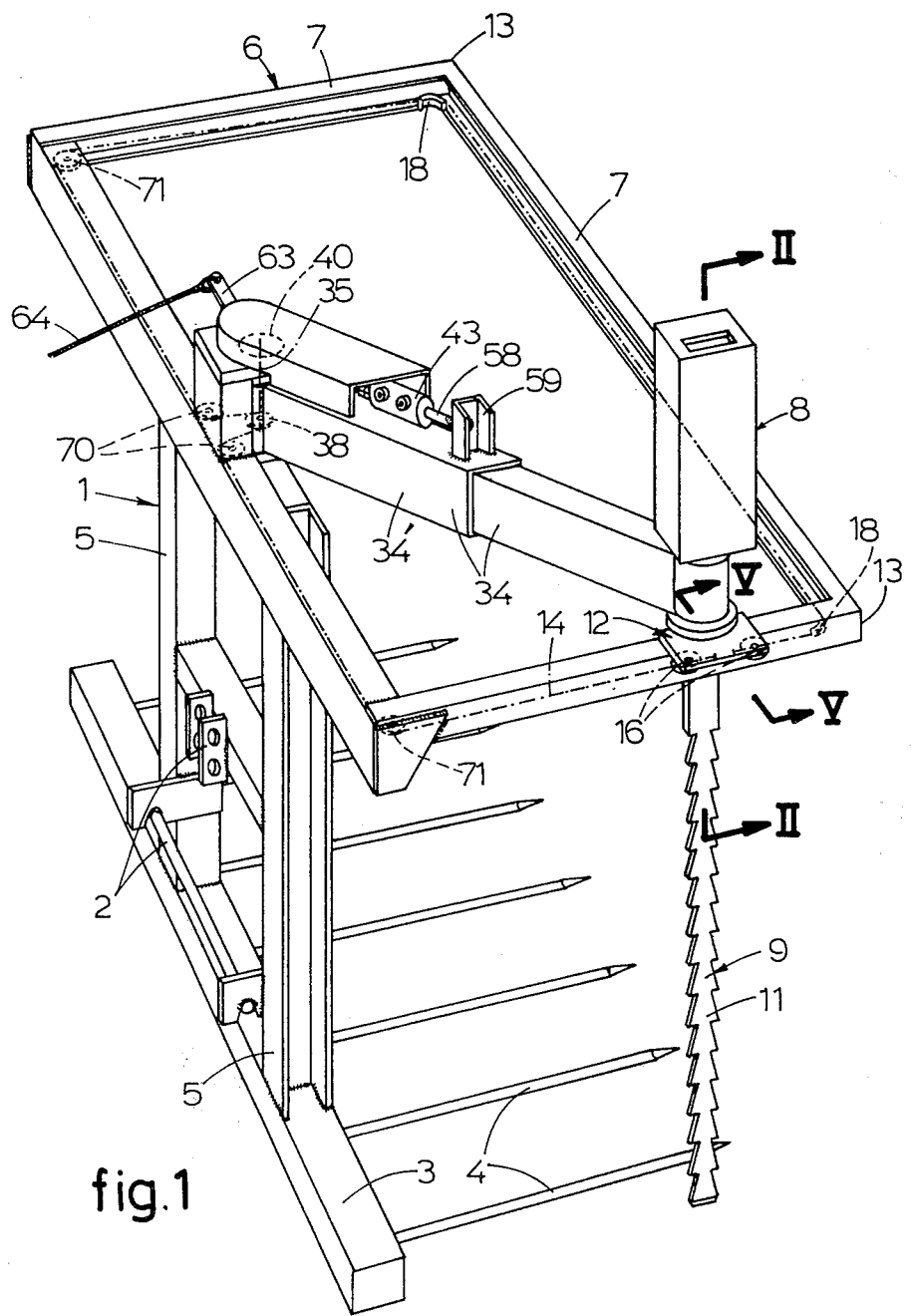
FIG. 1 is a schematic perspective view of an embodiment of a device according to the invention.
Figure 6:
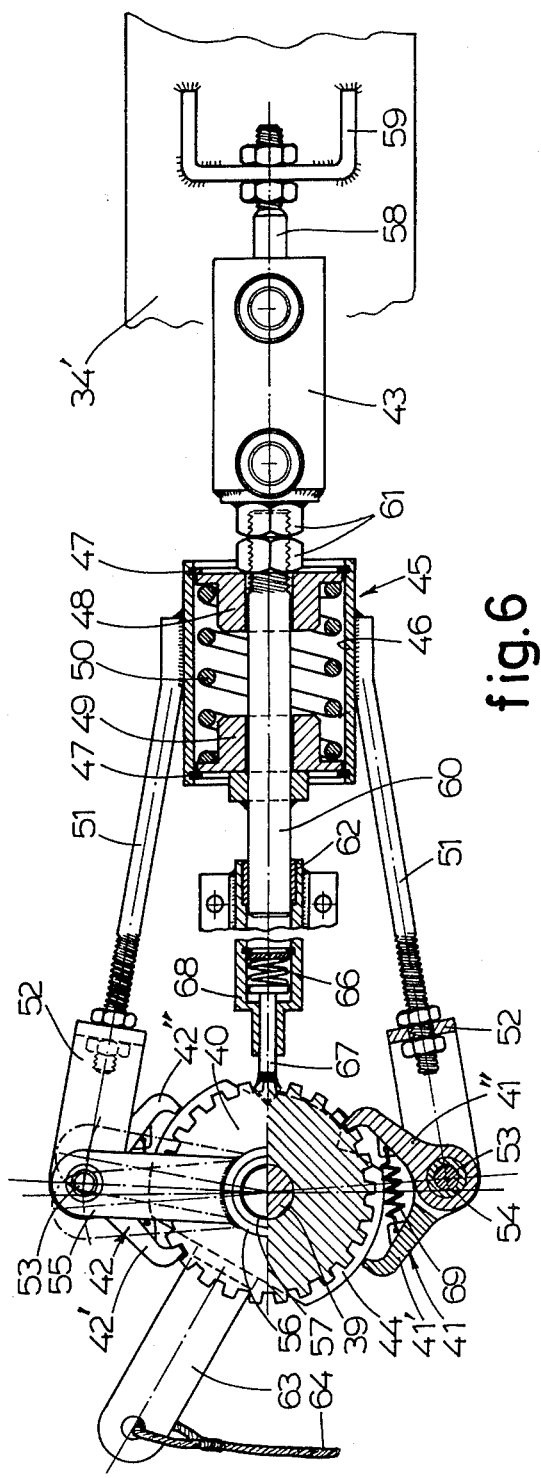
FIG. 6 is a top plan view, partially in section, of the feed cylinder for the ratchet mechanisms for the intermittent movement of the drive housing along the U-shaped guide.

The device according to the invention for cutting out and transporting a silage block, as illustrated in the drawings by way of example, comprises a main frame 1, provided with a removable connector 2, with which the device can be connected to the three-point linkage of a tractor.

The main frame 1 comprises a horizontal cross-beam 3 fitted with a number of parallel, approximately horizontal, tines 4. The cross-beam 3 is connected to an upwardly directed main frame part 5, which supports a horizontal frame member 6 of essentially rectangular shape at its top end. This frame member 6 forms a U-shaped guide 7 along which a drive housing 8 may be reciprocated. A sawing means 9 is guided in this drive housing 8 for upward and downward movement. This sawing means 9 comprises a supporting section 10 which carries a saw 11 which protrudes downwardly therefrom.

The drive housing 8 is fitted on a carriage 12 which is guided along a plurality of U-sections which form the U-shaped guide 7. This carriage 12 is reciprocated along the U-shaped guide 7 in such manner, that when the sawing means 9 is in the two corners 13 of the U-shaped guide 7 remote from the upstanding main frame part 5, it can rotate over approximately 90° about an axis of rotation which intersects the cross-section of the saw 11 at right angles, and which remains stationary during this rotation.

In the embodiment illustrated in the drawing, this axis of rotation coincides with the longitudinal center line of the saw 11, but it is also possible to let this axis of rotation be at some distance from this longitudinal center line of the saw 11.

This distance should not be too large, however, and should be smaller than the width of the sawing means 9 and preferably smaller than half the width of the sawing means 9.

The drive housing 8 is fixedly attached to an intermittently driven transport chain 14, which extends along the frame member 6 and which both displaces and rotates the carriage 12, as is shown in FIG. 1. The carriage 12 carries a fixed tooth 15 which is connected to the transport chain 14, and is therefore always in engagement therewith. The pressure force by which the saw 11 is pushed through the silage is exerted via this transport chain 14.

The carriage 12 is provided with two external rollers 16 which can rotate about vertical axes, and is further provided with an internal roller 17 which can also rotate about a vertical axis. By means of these rollers the carriage is guided along the upstanding webs of the U-sections 7' forming the guide 7. In the two corners 13 of the U-shaped guide 7, remote from the upstanding main frame part 5, an abutment plate 18 is attached to the frame 6. Each abutment plate 18 is bent about a vertical axis and extends over an angle of 90°.

These abutment plates 18 interact with a cylindrical sleeve 19 in the carriage 12.

The carriage 12 is normally blocked against rotation by means of the rollers 16 and 17, which interact with the U-sections forming the guide 7. However, in the corners 13 of the U-shaped guide 7, these rollers 16, 17 are released from the web of the relative U-section of the guide 7, when the sleeve 19 of the carriage 12 strikes the relative abutment plate 18 (FIG. 5).

The position of the rollers 16, 17 in the carriage 12 is such that these rollers 16, 17 can pass the corners 13 of the U-shaped guide 7, while the sleeve 19 rests against the relative abutment plate 18 and rotates over 90° about its center line. After this rotation, which is also followed by the drive housing 8 and the sawing means 9 moving upwardly and downwardly therein, the rollers 16, 17 are again in engagement with the web of the successive U-section of the guide 7.

As appears from FIGS. 4 and 5, the transport chain 14 is guided over the outer side of the bent abutment plates 18, which, when the carriage 12 passes, project upwardly in the carriage 12 between the sleeve 19 and the transport chain 14.

The longitudinal center line of the saw 11 coincides with the center line of the sleeve 19.

The sawing means 9 can be displaced upwardly and downwardly in the drive housing 8 by means of at least one hydraulic cylinder. In the embodiment shown in the drawings by way of example two hydraulic single acting cylinder-plunger units 20, 21 are used, the cylinder-plunger unit 20 being operative during the upward stroke of the sawing means 9, while the plunger unit 21 is operative during the downward stroke of the sawing means 9.

A reversing valve 22, which controls the aternate supply and discharge of the pressure liquid to both cylinder-plunger units 20, 21, may be operated by a trip lever 23, which is pivotally mounted in the drive housing 8. The one arm of the trip lever 23 carries a roller 24, which alternately comes into engagement with two elastic followers 25, 26, which are connected with the supporting section 10 of the sawing means 9 and which therefore follow the upward and downward movement of the sawing means 9. The other arm of the trip lever 23 carries a roller 27, which is received with clearance between two carriers 29, 30 formed on the valve slide 28 of the reversing valve 22.

A trip lever spring 32, which engages the drive housing 8 as well as a side arm 31 connected to the trip lever 23 is displaced through its dead center position after the roller 24 engages one of the two followers 25, 26, whereafter the trip lever spring 32 displaces the trip lever 23 further. The roller 27 then comes into engagement with one of the two carriers 29, 30 and displaces the same, so that the valve slide 28 is displaced and the supply of pressure liquid to the one cylinder-plunger unit 20 or 21 is interrupted, while the supply of liquid under pressure to the other cylinder-plunger unit 21 or 20 starts. At the same time the first mentioned cylinder-plunger unit 20, 21 is connected through the reversing valve 22 to the liquid discharge.

The supporting section 10 of the sawing means 9, with which the cylinder-plunger 20, 21 are in engagement may be displaced upwardly and downwardly between roller pairs 33 mounted one above the other in the drive housing 8. The rollers of the roller pairs 33 may be adjustable in order to be adapted to deviations in the width of the supporting section 10.

The saw 11 will also be displaced upwardly and downwardly during the above described rotational movement in the corners 13 of the U-shaped guide 7.

A supporting arm 34 which is telescopical in the longitudinal direction is supported by the upstanding main frame part 5 and may pivot with respect thereto about a vertical axis of rotation 35. At its other end the supporting arm is pivotally connected with the carriage 12. For this purpose this latter end of the supporting arm 34 is fixedly connected with two support flanges 36, which are rotatably mounted on the sleeve 19. Two distance rings 37 are welded to this sleeve 19 and cooperate with the support flanges 36 to ensure the correct relative position of the supporting arm 34 and the sleeve 19.

In order to move the carriage 12 in two opposite directions along the U-shaped guide 7, the transport chain 14 is passed over a drive sprocket wheel 38, which is coupled with a ratchet wheel 40 through a shaft 39 having a center line which coincides with the vertical axis of rotation 35, said ratchet wheel 40 being rotatably mounted on the part 34' of the supporting arm 34 and being rotatable in opposite directions by means of two ratchet mechanisms 41 and 42, which are reciprocated together by means of a hydraulic feed cylinder 43.

Each ratchet mechanism 41, 42 is provided with two pawls 41', 41" and 42', 42" respectively, which may be alternately disconnected with respect to the ratchet wheel 40 by means of a disconnecting plate 44, which is rotatably mounted underneath the ratchet wheel 40 and which is displaceable between two end positions. A buffer member 45 is mounted between the feed cylinder 43 and the ratchet mechanisms 41, 42.

This buffer member 45 consists of a sleeve 46, which supports two inner rings 47, against which spring brackets 48, 49 rest, between which a buffer spring 50 is mounted.

The two ratchet mechanisms 41, 42 are each connected with the sleeve 46 through a rod 51, which is welded to the sleeve 46. This rod 51 is slightly elastically deformable and is provided with a threaded end, to which a fork 52 is adjustably mounted by means of nuts. A cross-shaft 53 is passed through the legs of each fork 52. On this cross-shaft 53 a bush 54 is mounted, which is also passed through the legs of the fork 52 and on which both pawls 41', 41" and 42', 42" respectively are journalled. Four supporting arms 55 are journalled on the cross-shafts 53 as well, which supporting arms are positioned in pairs outside each fork 52 and are each welded to a ring 56, which is rotatable about an inner bush 57, which is mounted on the shaft 39.

The feed cylinder 43 is provided with a piston rod 58, the threaded end of which is connected to an end bracket 59 by means of nuts, said end bracket 59 being mounted on the part 34' of the supporting arm 34. Instead of a piston rod 58 a plunger rod may be used, but in the embodiment shown by way of example the feed cylinder 43 is double acting and is therefore provided with a piston with a piston rod 58.

The feed cylinder 43 carries a feed rod 60, which passes through the spring brackets 48, 49 and which is screwed with a threaded end in nuts 61, one nut of which is welded to the feed cylinder 43, while the other nut engages the spring bracket 48.

The free end of the feed rod 60 is guided in a guide bushing 62, which is mounted on the part 34' of the supporting arm 34.

The disconnecting plate 44 is displaceable from its one end position to its other end position and vice versa by means of a displacing member attached thereto, which is actuated by the tractor driver from the tractor. This displacing member consists of a lip 63 fixed to the disconnecting plate 44, while a rope 64 is attached to the lip 63.

The disconnecting plate 44 is provided with two recesses 65 along its circumference, a locking pin 67 which is loaded by a spring 66 engaging one of these recesses 65 in each of both end positions. This locking pin 67 is slidably mounted in a guide bush 68, which is supported by the part 34' of the supporting arm 34. The guide bushes 62 and 68, which lie at different heights with respect to the part 34' of the supporting arm 34, may be connected to each other or be integrally formed.

As mentioned already hereinbefore the ratchet mechanisms 41, 42 are each provided with two pawls 41', 41" and 42', 42" respectively. The pawls 41', 41" and 42', 42" of each pair may pivot about their shaft 53 and are pulled towards each other by means of a spring 69. In dependence of the position of the disconnecting plate 44 the inner pawl 41' or 42' of the one ratchet mechanism 41 or 42 and the outer pawl 42" or 41" of the other ratchet mechanism 42 or 41 rest against the disconnecting plate 44 and are out of engagement with the ratchet wheel 40, while the other two pawls 42' or 41' and 41" or 42" engage the ratchet wheel 40. During a reciprocating stroke of both ratchet mechanisms 41, 42 always the front pawl 41', 41", 42', 42" seen in the direction of movement of these ratchet mechanisms 41, 42 will rotate the ratchet wheel 40. In the position of the disconnecting plate 44 shown in the drawings, the pawls 41" and 42' are operative.

As indicated in FIG. 1 the transport chain 14 is guided over the drive sprocket wheel 38, two inner guide rollers 70 supported by the frame member 6, two outer guide rollers 71, which are supported by the frame member 6 and which lie in the corners of this frame member 6 on the side of the upstanding main frame part 5, and the two abutment plates 18 in the corners 13 of the U-shaped guide 7, which are remote from the upstanding main frame part 5.

FIG. 9 schematically shows the hydraulic circuit for the operation of the device according to the invention.

A supply line 72 and a return line 73 for pressure liquid, in particular oil, are connected to the tractor.

The valve 74, which interrupts the liquid supply in the position as shown in FIG. 9, may be displaced to the open position by means of a handle.

The supply line 72 and the return line 73 are connected to the reversing valve 22, which controls the supply and the discharge of the pressure liquid to the cylinder-plunger units 20, 21. In FIG. 9 this reversing valve 22 is shown in the position, wherein the pressure liquid is supplied to the cylinder-plunger unit 21 through the line 75, while the cylinder-plunger unit 20 is connected to the return line 73 through the line 76. In this position of the reversing valve 22 the sawing means 9 will be displaced downwardly, whilst the sawing means 9 will again be displaced upwardly by the cylinder-plunger unit 20 after the reversing valve 22 is actuated at the end of the downward stroke of the sawing means 9.

The hydraulic feed cylinder 43 which is double acting is connected to the lines 75 and 76 through the lines 77 and 78.

Upon actuation of the reversing valve 22 the feed cylinder 43 is displaced with respect to its fixed piston rod 58, so that this feed cylinder 43 operates both ratchet mechanisms 41, 42 through the buffer means 45. In dependency of the position of the disconnecting plate 44 the carriage 12 will be displaced along the U-shaped guide 7 in the one direction or in the other direction.

As is shown in FIG. 9 a back pressure valve 83 and a throttle bore 84 are inserted between the in- and outlet 79, 80 of each cylinder of both cylinder-plunger units 20, 21 and the reversing valve 22, thus in the lines 76 and 75.

The feed cylinder 43 does not only operate the ratchet mechanisms 41, 42, but also serves to absorb shocks during the inversion of the direction of displacement of the sawing means 9. When the reversing valve 22 is operated, the plungers of the cylinder-plunger units 20, 21 and the feed cylinder 43 are displaced. As soon as this feed cylinder 43 has reached the end of its stroke, the plungers are displaced further with an increased velocity. e.g. with the double velocity. By enlarging or decreasing the contents of the feed cylinder 43 the shocks which occur may be absorbed to a greater or a smaller extent.

When the saw 11 would always meet resistance during its upward and downward stroke the back pressure valves 83 and the throttle bores 84 would be superfluous, as in that case a pressure difference would always be present in the lines 77 and 78 leading to the feed cylinder 43. However, when the saw 11 does not meet any resistance, as this is often the case at the beginning of the sawing operation, no pressure difference would exist in the lines 77 and 78 if the back pressure valves 83 and the throttle bores 84 would not be applied. Under these circumstances the feed cylinder 43 would not be displaced, so that the ratchet mechanisms 41, 42 would not be actuated and the carriage 12 would remain in rest on the U-shaped guide 7.

The application of the back pressure valves 83 and the throttle bores 84 results in that the pressure liquid will have to flow through the throttle bore 84 belonging to the back pressure valve 83, which is in the closed position. In this way a resistance is met which results in a pressure difference in the lines 77 and 78 leading to the feed cylinder 43, which is sufficient to displace the feed cylinder 43.

Each throttle bore 84 may consist of a small bore through the valve body of the relative back pressure valve 83.

Both back pressure valves 83 have to be equally directed, so that these valves 83 are closed when pressure liquid is discharged from the cooperating cylinder-plunger unit 20 or 21 as shown in FIG. 9, or as an alternative, that these valves 83 are closed when pressure liquid flows towards the cooperating cylinder-plunger unit 20 or 21.

Due to the pressure difference, created by the operative throttle bore 84, the ratchet mechanisms 41, 42 will be operated as well when the saw 11 does not meet any resistance. Therefore, a displacement of the carriage 12 and thus of the saw 11 along the U-shaped guide 7 is ensured and the saw 11 will start to saw the silage immediately.

It is of great importance that the feed cylinder 43 is positioned as closely as possible to the cylinder-plunger units 20, 21, in order to obtain short lines for the pressure liquid to the feed cylinder 43, which has a small contents only.

In the case that the saw 11 will meet an increased resistance during the sawing operation the buffer means 45 will yield resiliently. This results in that the number of teeth of the ratchet wheel 40, which will be displaced by the ratchet mechanisms 41, 42 during a reciprocating stroke of the feed cylinder 43 is decreased, while it is even possible that the buffer means 45 yields to such extent that the ratchet wheel 40 is not rotated at all. In this manner a damage of the saw 11 is effectively prevented.

The invention is not restricted to the embodiment shown in the drawings by way of example, which may be varied in several ways within the scope of the appended claims.

We claim:

1. A device for cutting out and transporting a silage block, comprising a main frame, means to connect said frame to a tractor, said main frame comprising a substantially horizontal cross-beam, a plurality of substantially horizontal parallel tines attached to said cross-beam, an upstanding main frame part connected to said cross-beam, a substantially horizontal frame member supported at the upper end of said upstanding main frame part, a substantially U-shaped guide member integral with said horizontal frame member, a drive housing operatively engaging said guide member for movement therealong, a sawing means mounted and guided in said drive housing for upward and downward movement, drive means on said horizontal frame member for moving said drive housing along said U-shaped guide member, both corners of said U-shaped guide member remote from the upstanding main frame part being substantially right angle corners, and means for rotating said sawing means at said corners through at least approximately 90° about an axis of rotation which is substantially stationary during this rotating motion and which substantially coincides with the longitudinal center line of the sawing means.

2. A device according to claim 1, wherein said drive housing is fastened on a carriage, said carriage being guided along said U-shaped guide, said U-shaped guide being formed of substantially straight sections, said drive means comprising a drive chain extending along said horizontal frame member, and means to drive said drive chain, said chain operatively engaging said carriage.

3. A device according to claim 2, wherein the carriage carries a fixed tooth and said drive chain is in engagement with said tooth.

4. A device according to claim 2, wherein said carriage is guided along said sections forming the U-shaped guide by means of two spaced outer rollers rotatably mounted on said carriage on substantially vertical axes and by means of one internal roller mounted on said carriage rotatable about a substantially vertical axis, an abutment plate is connected at each of said corners of the U-shaped guide, said abutment plate being curved about a substantially vertical axis and extending over an angle of substantially 90°, a cylindrical sleeve having a substantially vertical axis on said carriage, said sleeve and said rollers being positioned with respect to each other so that the carriage is normally blocked against rotation by means of the rollers cooperating with one of the sections forming the U-shaped guide, but that said rollers at said corners of the guide are released from said one section, while said sleeve engages the respective abutment plate, whereby the carriage is rotated said substantially 90°, and said rollers engage the next section of the U-shaped guide as the carriage moves therealong.

5. A device according to claim 4, wherein the longitudinal axis of the sawing means substantially coincides with the longitudinal axis of said sleeve.

6. A device according to claim 5, wherein said sections of the U-shaped guide are U-shaped and the rollers cooperatively engage with the upstanding web of said U-shaped sections.

7. A device according to claim 5, wherein said drive chain is guided over the outside of said curved abutment plates, and said plates project upwardly between said sleeve and said drive chain when the carriage is at said corners.

8. A device according to claim 1, wherein said sawing means comprises a substantially vertically disposed saw blade and at least one hydraulic cylinder-plunger unit mounted in said drive housing and connected to said saw blade, and means to operate said cylinder-plunger unit.

9. A device according to claim 8, wherein said sawing means includes two hydraulic cylinder-plunger units connected to said saw blade, and said means to operate said unit is operatively connected to both units so that one unit produces the upward stroke of the sawing blade and the other unit produces the downward stroke of the sawing blade.

10. A device according to claim 9, wherein said means to operate said units comprises a reversing valve mounted in said drive housing, which controls the alternate supply and discharge of hydraulic fluid to both cylinder-plunger units, a trip lever pivotally mounted in the drive housing, two followers mounted in said housing to move with said saw blade, one arm of the trip lever alternately engaging said two followers, the other arm of the trip lever being positioned between two spaced carriers formed on the valve slide of the reversing valve to shift said slide between two positions with a lost motion effect, a trip lever spring engaging said drive housing and the trip lever, so that said spring is displaced through a dead center position after said one trip lever arm engages one of the two followers, and thereafter further displaces the trip lever, the other trip lever arm engaging one of the two carriers and displacing the same.

11. A device according to claim 9, wherein the sawing means further comprises a supporting section attached to said saw blade, said cylinder-plunger units engaging said supporting section to displace it upwardly and downwardly and roller pairs mounted in spaced relationship in the drive housing, said supporting section passing between each roller pair to be guided thereby.

12. A device according to claim 11, wherein the rollers of the two roller pairs are adjustable.

13. A device according to claim 2, wherein a telescoping supporting arm is pivotally supported on the upstanding main frame part about an upstanding axis of rotation, and means to pivotally connect said supporting arm to the carriage, comprising two spaced rings fixed on said cylindrical sleeve in abutting relationship between two support flanges mounted on the end of said supporting arm.

14. A device according to claim 2, and further comprising a sprocket wheel engaging said drive chain, a ratchet wheel coupled to said sprocket wheel by a common shaft, the ratchet wheel being rotatable in opposite directions by means of two ratchet mechanisms each comprising two pawls, a disconnecting plate, which is displaceable between two end positions operatively associated with said pawls to alternately disconnect said pawls from said ratchet wheel, and a hydraulic feed cylinder operatively connected to said ratchet mechanisms to reciprocate them together.

15. A device according to claim 14, wherein the ratchet wheel is mounted on the supporting arm.

16. A device according to claim 15, wherein a buffer member is mounted between the feed cylinder and the ratchet mechanisms.

17. A device according to claim 16, wherein the buffer member comprises a buffer sleeve, two spaced inner rings in said buffer sleeve, two spaced spring brackets in said sleeve resting against said rings, a buffer spring being received between said spring brackets, said two ratchet mechanisms being connected with said buffer sleeve, and a feed rod extending from said feed cylinder and engaging one of said spring brackets.

18. A device according to claim 17, wherein said feed cylinder is provided with a piston rod attached to an end bracket mounted on the supported arm, so that said feed cylinder together with said feed rod reciprocate with respect to said supporting arm.

19. A device according to claim 17, wherein the free end of the feed rod is guided in a bushing fastened to the supporting arm.

20. A device according to claim 14, wherein said disconnecting plate is displaceable from its one end position into its other end position and vice versa, by means of a displacing member attached thereto, said displacing member being manually actuated from the tractor.

21. A device according to claim 20, wherein said displacing member comprises a lip fixed to the disconnecting plate, a rope being attached to the lip to actuate said displacing member.

22. A device according to claim 21, wherein said disconnecting plate is provided with two spaced recesses along its periphery, and a spring loaded locking pin engages said recesses in each end position.

23. A device according to claim 22, wherein said locking pin is slidably mounted in a guide bushing supported by the supporting arm.

24. A device according to claim 23, wherein said two pawls on each ratchet mechanism are mounted to pivot about the same axis and a pawl spring means is provided to pull said pawls towards each other so that the inner pawl of one mechanism and the outer pawl of the other mechanism, with respect to the feed cylinder, rest against the disconnecting plate and are out of engagement with the ratchet wheel, while the other two pawls engage the ratchet wheel.

25. A device according to claim 14, and further comprising two inner guide rollers supported adjacent said sprocket wheel by said horizontal frame member, two outer guide rollers supported by said horizontal frame member in the corners on the side of the upstanding main frame part, said drive chain passing over said sprocket wheel, guide rollers and the two abutment plates in the corners of the frame member which are remote from the upstanding main frame part.

26. A device according to claim 10 and further comprising a sprocket wheel engaging said drive chain, a ratchet wheel coupled to said sprocket wheel by a common shaft, the ratchet wheel being rotatable in opposite directions by means of two ratchet mechanisms each comprising, two pawls, a disconnecting plate, which is displaceable between two end positions operatively associated with said pawls to alternately disconnect said pawls from said ratchet wheel, and a hydraulic feed cylinder operatively connected to said ratchet mechanisms to reciprocate them together.

* * * * *